United States Patent
Nam et al.

(10) Patent No.: US 7,619,815 B2
(45) Date of Patent: Nov. 17, 2009

(54) PARALLAX BARRIER AND THREE-DIMENSIONAL DISPLAY DEVICE USING THE SAME

(75) Inventors: Hui Nam, Suwon-si (KR); Jang-Doo Lee, Suwon-si (KR); Hyoung-Wook Jang, Suwon-si (KR); Myoung-Seop Song, Suwon-si (KR); Beom-Shik Kim, Suwon-si (KR)

(73) Assignee: Samsung Mobile Display Co., Ltd., Yongin (KR)

(*) Notice: Subject to any disclaimer, the term of this patent is extended or adjusted under 35 U.S.C. 154(b) by 317 days.

(21) Appl. No.: 11/102,433

(22) Filed: Apr. 7, 2005

(65) Prior Publication Data

US 2005/0225502 A1   Oct. 13, 2005

(30) Foreign Application Priority Data

Apr. 7, 2004   (KR) .................. 10-2004-0023744

(51) Int. Cl.
*G02B 27/22* (2006.01)
*H04N 13/04* (2006.01)

(52) U.S. Cl. ..................... 359/464; 359/462; 348/51

(58) Field of Classification Search ............. 359/465, 359/462, 464, 494, 463; 348/51, 53, 56
See application file for complete search history.

(56) References Cited

U.S. PATENT DOCUMENTS 5,663,831 A * 9/1997 Mashitani et al. ........... 359/463
6,055,103 A * 4/2000 Woodgate et al. ........... 359/494
6,094,216 A * 7/2000 Taniguchi et al. ........... 348/51
6,128,132 A   10/2000 Wieland et al.
2003/0067460 A1   4/2003 Tomono

FOREIGN PATENT DOCUMENTS

| GB | 2396070 A | 6/2004 |
|---|---|---|
| JP | 2004-264762 A | 9/2004 |
| KR | 10-2004-0049823 | 6/2004 |

OTHER PUBLICATIONS

Korean Patent Abstracts for Publication No. 1020040049823 A; Date of Publication of Application Jun. 12, 2004 in the name of Diana U. Kean, et al.
Patent Abstracts of Japan, Publication No. 2004-264762, Published Sep. 24, 2004, in the name of Shinichiro et al.

* cited by examiner

*Primary Examiner*—Audrey Y Chang
(74) *Attorney, Agent, or Firm*—Christie, Parker & Hale, LLP

(57) ABSTRACT

A three-dimensional display device having a capacity to display three-dimensional images with a resolution level of two-dimensional images. The three-dimensional display device includes an image display unit where left sub-pixels corresponding to a left-eye image part and right sub-pixels corresponding to a right-eye image part are formed in a pattern in a sub-pixel array having rows and columns respectively arranged in a row direction and a column direction. A parallax barrier, which is adjacent to the image display unit, has a plurality of light interception portions and light transmission portions. Centers of the light transmission portions in the column direction of the sub-pixel array are offset from each other in the row direction of the sub-pixel array.

23 Claims, 16 Drawing Sheets

PARALLAX BARRIER AND THREE-DIMENSIONAL DISPLAY DEVICE USING THE SAME

CROSS REFERENCE TO RELATED APPLICATION

This application claims priority to and the benefit of Korean Patent Application No. 10-2004-0023744 filed on Apr. 7, 2004 in the Korean Intellectual Property Office, the entire content of which is incorporated herein by reference.

BACKGROUND OF THE INVENTION

1. Field of the Invention

The present invention relates to a three-dimensional (3D) display device, and in particular, to an autostereoscopy-type 3D display device.

2. Description of Related Art

Generally, 3D displays supply different views to the left and right eyes of a user such that the user can have the depth perception of the viewing images. The 3D displays may be classified into a stereoscopic display where the user should wear viewing aids, such as polarizing glasses, and an autostereoscopic display where the user can see the desired 3D image without wearing such viewing aids.

A common autostereoscopic display utilizes an optical separation element (or optical isolation element), such as a lenticular lens, a parallax barrier or a microlens array, to spatially separate or isolate the left-eye image part and the right-eye image part displayed at the image display unit in the directions of the left and right eyes of the user, respectively. For example, the parallax barrier may be formed with a liquid crystal shutter utilizing a transmission type liquid crystal display, and in this case, it may be converted between a 2D mode and a 3D mode.

FIG. 13 is a schematic view of a 3D display device using a parallax barrier according to prior art, and FIG. 14 is a partial sectional view of the 3D display device of FIG. 13.

As shown in the drawings, the 3D display device includes an image display unit 3 where sub-pixels 1L corresponding to the left-eye image part and sub-pixels 1R corresponding to the right-eye image part are arranged in a pattern, and a parallax barrier 9 placed in front of the image display unit 3 with slit-shaped light interception and light transmission portions 5 and 7 longitudinally arranged in the direction of the column of the array of sub-pixels 1 (i.e., in the direction of the Y axis of FIG. 13).

Sets of red (r), green (g) and blue (b) sub-pixels 1 are repeatedly arranged in the direction of the row of the array (i.e., in the direction of the axis X of FIG. 13), and the same-colored sub-pixels are serially arranged in the direction of the column of the array. The parallax barrier 9 has light interception and light transmission portions 5 and 7 alternately and repeatedly arranged in the direction of the row of the array.

With the above structure, the right-eye image part displayed at the right-eye sub-pixels 1R of the image display unit 3 is separated to the right eye of the viewer through the light transmission portions 7 of the parallax barrier 9, and the left-eye image part displayed at the left-eye sub-pixels 1L of the image display unit 3 is separated to the left eye of the viewer through the light transmission portions 7 of the parallax barrier 9. Consequently, the viewer perceives the images of the image display unit 3 as 3D images.

As described above, the prior art-based parallax barrier 9 has slit-shaped light transmission portions 7 longitudinally extending in the direction of the column of the array to display the images of the display unit 3 as 3D images. With such a structure, the horizontal resolution of the 3D images (i.e., measured in the direction of the row of the array, and referred to hereinafter as the horizontal resolution) is at best half the horizontal resolution of the 2D images.

That is, with the 3D display device shown in FIG. 13, among the six sub-pixels 1 continuously arranged in the direction of the row of the array, the three odd-numbered sub-pixels 1R corresponding to the right-eye image part form one pixel R1' for the right-eye image, and the remaining three even-numbered sub-pixels 1L corresponding to the left-eye image part form one pixel L1' for the left-eye image. Further, among the next group of six sub-pixels 1 continuously arranged in the direction of the row of the array, the three odd-numbered sub-pixels 1R corresponding to the right-eye image part form one pixel R2' for the right-eye image, and the remaining three even-numbered sub-pixels 1L corresponding to the left-eye image part form one pixel L2' for the left-eye image.

Consequently, the horizontal resolution of the left-eye image and the right-eye image is lowered to be half the horizontal resolution of the 2D image where one pixel P1 or P2, as shown in FIG. 15, is formed with three sub-pixels 11 continuously arranged in the direction of the row of the array (in the direction of the X axis of FIG. 15). Because of such reduction in resolution, it is difficult to realize high resolution 3D images with the prior art-based 3D display device.

Meanwhile, with the recently developed 3D display devices, as the pixel size is gradually reduced, the sub-pixels arranged in the direction of the row of the array are grouped together by two or three, and the right-eye image signals and the left-eye image signals are alternately and repeatedly input thereto.

FIGS. 16 and 17 are schematic views of an image display unit and a parallax barrier of 3D display devices according to other prior art, respectively.

FIG. 16 illustrates the way of alternately and repeatedly inputting the right-eye image signals R and the left-eye image signals L at an image display unit 1' to a plurality of sub-pixel pairs 1' arranged in the direction of the row of the array of sub-pixels 1' (in the direction of the X axis of FIG. 16). In this case, the light transmission portions 7' of a parallax barrier 13 are separated by light interception portions 5', and are disposed between a pair of sub-pixels 1R' corresponding to the right-eye image part and a pair of sub-pixels 1L' corresponding to the left-eye image part.

FIG. 17 illustrates the way of alternately and repeatedly inputting the right-eye image signals R and the left-eye image signals L at an image display unit 15 to a plurality of sub-pixels 1" grouped by three and arranged in the direction of the row of the array of sub-pixels 1" (in the direction of the X axis of FIG. 17). In this case, the light transmission portions 7" of a parallax barrier 17 are separated by light interception portions 5", and are disposed between three sub-pixels 1R" corresponding to the right-eye image part and three sub-pixels 1L" corresponding to the left-eye image part.

With the 3D display devices shown in FIGS. 16 and 17, the horizontal resolution of the left-eye image and the right-eye image is also lowered to be half the horizontal resolution of the 2D image shown in FIG. 15.

SUMMARY OF THE INVENTION

In one exemplary embodiment of the present invention, there is provided a 3D display device which has a parallax barrier, and enables the displaying of 3D images with a high resolution level of 2D images.

In an exemplary embodiment of the present invention, a parallax barrier for a 3D display device is provided. The 3D display device includes an image display unit having sub-pixels for generating a display image having a left-eye image part and a right-eye image part. The sub-pixels are organized into a sub-pixel array of rows and columns respectively arranged in a row direction and a column direction. The parallax barrier is configured to provide the display image to a viewer as a three-dimensional image, and includes a plurality of light interception portions and a plurality of light transmission portions arranged such that centers of the light interception portions and centers of the light transmission portions in the column direction of the sub-pixel array are offset from each other in the row direction of the sub-pixel array.

The centers of the light transmission portions in the column direction of the sub-pixel array may be regularly offset from each other in the row direction of the sub-pixel array with a predetermined cycle.

The light interception portions and the light transmission portions may be organized into a plurality of rows arranged in the column direction of the sub-pixel array, such that the centers of the light transmission portions in two adjacent rows among the plurality of rows are offset from each other.

In another exemplary embodiment of the present invention, a 3D display device includes an image display unit having left sub-pixels corresponding to a left-eye image part and right sub-pixels corresponding to a right-eye image part. The left and right sub-pixels are formed in a pattern in a sub-pixel array having rows and columns respectively arranged in a row direction and a column direction. The 3D display device also includes a parallax barrier having a plurality of light interception portions and a plurality of light transmission portions. The parallax barrier is adjacent to the image display unit. Centers of the light interception portions and centers of the light transmission portions in the column direction of the sub-pixel array are offset from each other in the row direction of the sub-pixel array.

One of the left-eye sub-pixels and one of the right-eye sub-pixels may be alternately and repeatedly arranged in the row and column directions of the sub-pixel array.

Alternatively, two of the left-eye sub-pixels and two of the right-eye sub-pixels may be alternately and repeatedly arranged in the row direction on a first said row of the sub-pixel array, and the sub-pixels on a second said row of the sub-pixel array may be offset by at most two sub-pixels in the row direction with respect to the sub-pixels on the first said row.

It is also possible that three of the left-eye sub-pixels and three of the right-eye sub-pixels may be alternately and repeatedly arranged in the row direction on a first said row of the sub-pixel array, and the sub-pixels on a second said row of the sub-pixel array may be offset by at most three sub-pixels in the row direction with respect to the sub-pixels on the first said row.

An inter-center distance p1 between the light transmission portions of the parallax barrier in the row direction of the sub-pixel array may satisfy one of the following equations:

$$p_1 = \frac{2nR'W_1}{R'+r'}, \text{ and } p_1 = \frac{2n(R'+r')W_1}{R'}$$

where R' is a visual range of viewing a three-dimensional image by a viewer, r' is a distance between a pixel interface of the image display unit and an image separation interface of the parallax barrier, $W_1$ is an inter-center distance between the sub-pixels measured in the row direction of the sub-pixel array, and n is a number of the left-eye sub-pixels or the right-eye sub-pixels continuously arranged in the row direction of the sub-pixel array.

When one of the left-eye sub-pixels and one of the right-eye sub-pixels are alternately and repeatedly arranged in the row and column directions of the sub-pixel array, an inter-center distance $p_2$ between the light transmission portions of the parallax barrier in the column direction of the sub-pixel array may satisfy one of the following equations:

$$p_2 = \frac{2R'W_2}{R'+r'}, \text{ and } p_2 = \frac{2(R'+r')W_2}{R'}$$

where R' is a visual range of viewing a three-dimensional image by a viewer, r' is a distance between a pixel interface of the image display unit and an image separation interface of the parallax barrier, and $W_2$ is an inter-center distance between the sub-pixels measured in the column direction of the sub-pixel array.

BRIEF DESCRIPTION OF THE DRAWINGS

The accompanying drawings, together with the specification, illustrate exemplary embodiments of the present invention, and together with the description, serve to explain the principles of the present invention.

DETAILED DESCRIPTION

The present invention will be described more fully hereinafter with reference to the accompanying drawings, in which certain exemplary embodiments of the present invention are shown.

Figure 1:
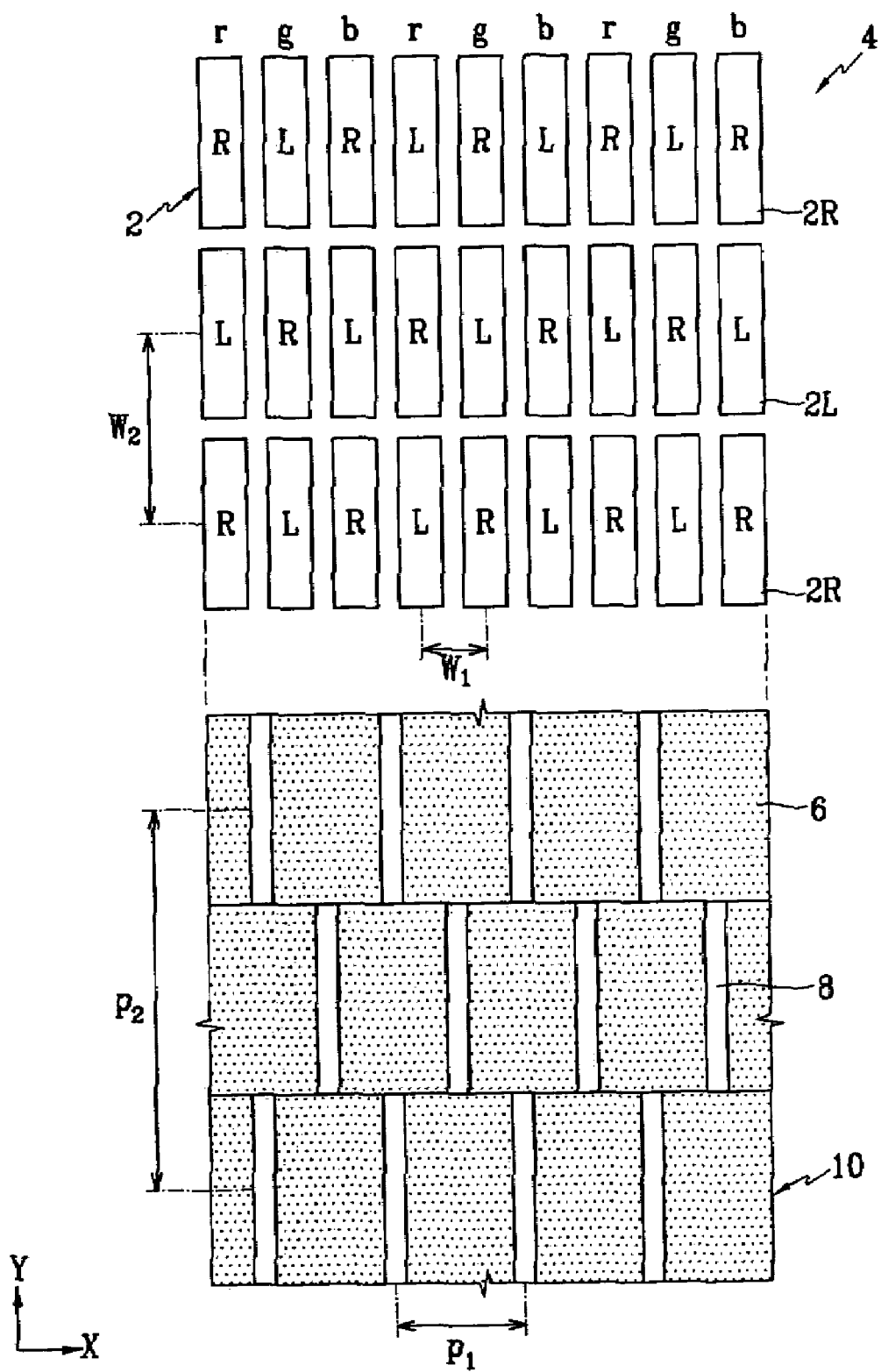
FIG. 1 is a schematic view of a 3D display device according to a first exemplary embodiment of the present invention.
Figure 2A:
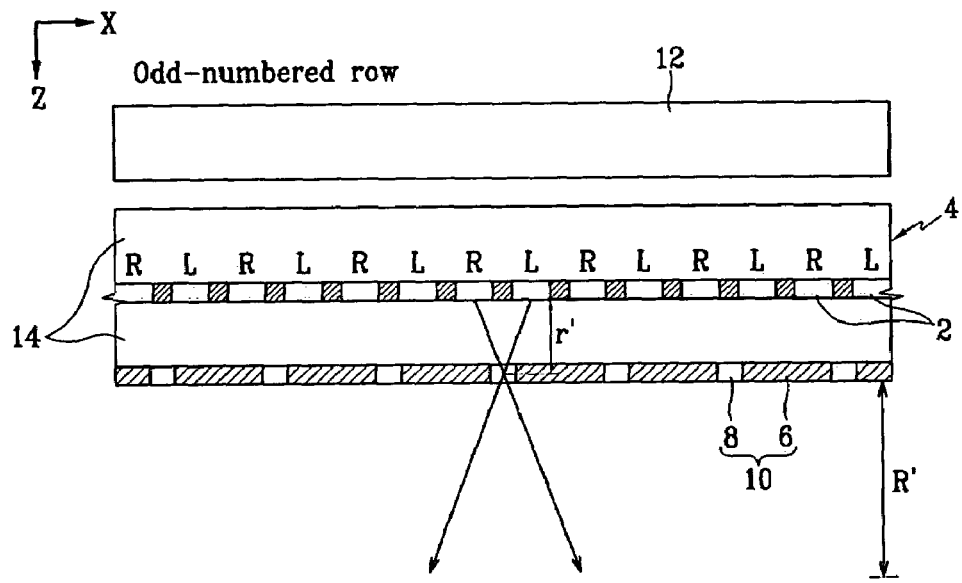
FIGS. 2A and 2B are partial sectional views of the 3D display device shown in FIG. 1, respectively illustrating the cross sections thereof at an odd-numbered row and an even-numbered row.
Figure 2B:
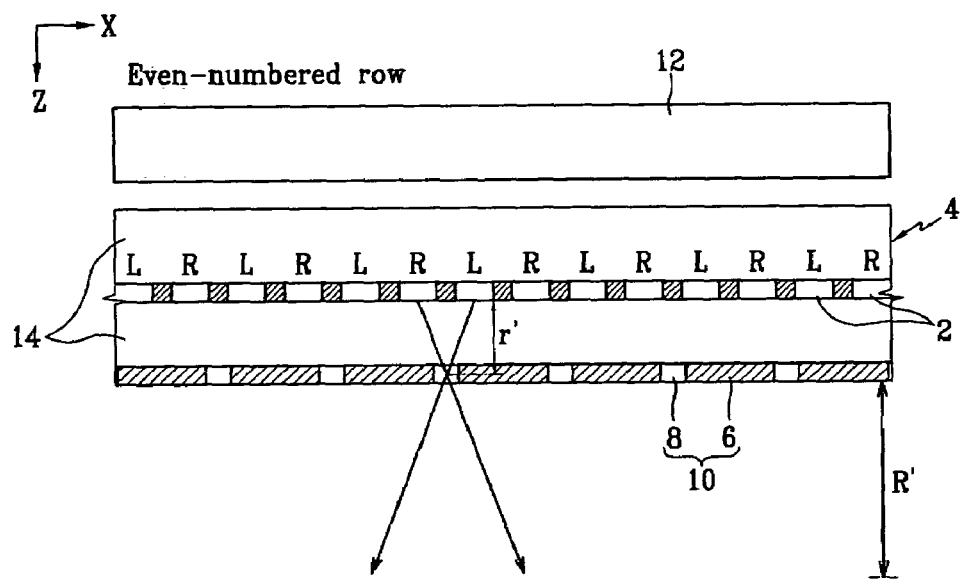

FIG. 1 is a schematic view of a 3D display device according to a first exemplary embodiment of the present invention, and FIGS. 2A and 2B are partial sectional views of the 3D display device of FIG. 1, respectively illustrating the cross sections thereof at an odd-numbered row and an even-numbered row.

As shown in FIGS. 1, 2A and 2B, the 3D display device has an image display unit 4 where sub-pixels 2L corresponding to the left-eye image part and sub-pixels 2R corresponding to the right-eye image part are arranged in a pattern, and a parallax barrier 10 is placed in front of the image display unit 4 with light interception portions 6 and light transmission portions 8.

Any suitable display device may be applied for use as the image display unit 4. For instance, the image display unit 4 may be formed with a cathode ray tube, a liquid crystal display, a plasma display panel, a field emission display, an organic electroluminescence display, or any other suitable display device.

The parallax barrier 10 separates the left-eye and right-eye image parts made at the image display unit 4 through the light transmission portions 8 in the left-eye and right-eye directions, thereby displaying the images of the image display unit 4 three-dimensionally.

The parallax barrier 10 arranges the light interception portions 6 and the light transmission portions 8 in a predetermined way to increase the horizontal resolution of the 3D images (indicating the resolution measured in the direction of the row of the array, and referred to hereinafter as the "horizontal resolution").

In this embodiment, the light interception portions 6 and the light transmission portions 8 are arranged such that the centers thereof in the direction of the columns of the array (i.e., in the direction of the Y axis of FIG. 1) are offset from each other in the direction of the rows of the array (i.e., in the direction of the X axis of FIG. 1). That is, the light interception portions 6 and the light transmission portions 8 are not rectilinearly arranged in the direction of the columns of the array, but their centers are regularly offset from each other in the direction of the rows of the array. For instance, the light interception portions 6 and the light transmission portions 8 may be said to be zigzag-patterned.

Accordingly, in this embodiment, the parallax barrier 10 is partitioned into a plurality of rows where the centers of the light interception portions 6 as well as the centers of the light transmission portions 8 are offset from each other. The odd-numbered rows and the even-numbered rows of the parallax barrier 10 shown in FIG. 1 should be arranged to correspond to the rows of the array of sub-pixels 2 provided at the image display unit 4 in a one to one correspondence manner.

When viewed from the front side, the light interception portions 6 and the light transmission portions 8 of the parallax barrier 10 are arranged in a triangular pattern. The triangular-patterned arrangement serves to enhance the horizontal resolution of the 3D images in combination with the arrangement of sub-pixels 2L corresponding to the left-eye image part and the arrangement of sub-pixels 2R corresponding to the right-eye image part.

As shown in FIG. 1, red (r), green (g) and blue (b) sub-pixel sets 2 are repeatedly arranged at the image display unit 4 in the direction of the row of the sub-pixel array 2, and the same-colored sub-pixels 2 are serially arranged in the direction of the column of the array.

Any one of the left-eye image signals L and the right-eye image signals R is input into the respective sub-pixels 2 such that they emit light with a predetermined luminance. With the image display unit 4 according to the present embodiment, the right-eye image signals R and the left-eye image signals L are alternately and repeatedly input into the respective sub-pixels 2 arranged in the direction of the row of the array, and the right-eye image signals R and the left-eye image signals L are alternately and repeatedly input into the respective sub-pixels 2 arranged in the direction of the column of the array.

It is illustrated in the drawings that with the image display unit 4, the odd-numbered and even-numbered sub-pixels of the odd-numbered row display the right-eye and left-eye images, respectively. The odd-numbered and even-numbered sub-pixels of the even-numbered column display the left-eye and right-eye images, respectively.

Accordingly, as shown in FIGS. 2A and 2B, with the odd-numbered row of the image display unit 4, the right-eye and left-eye images displayed at the odd-numbered sub-pixels and the even-numbered sub-pixels are separated in the directions of the right eye and the left eye of the viewer through the light transmission portions 8. With the even-numbered row of the image display unit 4, the left-eye image and the right-eye image displayed at the odd-numbered sub-pixels and the even-numbered sub-pixels are separated in the directions of the left eye and the right eye of the viewer through the light transmission portions 8.

By way of example, the image display unit 4 shown in FIGS. 2A and 2B is illustrated as a liquid crystal display, and a light source 12 is provided at the back of the image display unit 4. Transparent electrodes, alignment layers and a liquid crystal layer (not shown) are disposed between a pair of substrates 14 forming the image display unit 4 to make a substantial pixel interface for the displaying. The sub-pixels 2 are illustrated at the pixel interface. Of course, any other suitable display device may be used instead of the illustrated liquid crystal display.

Figure 3:
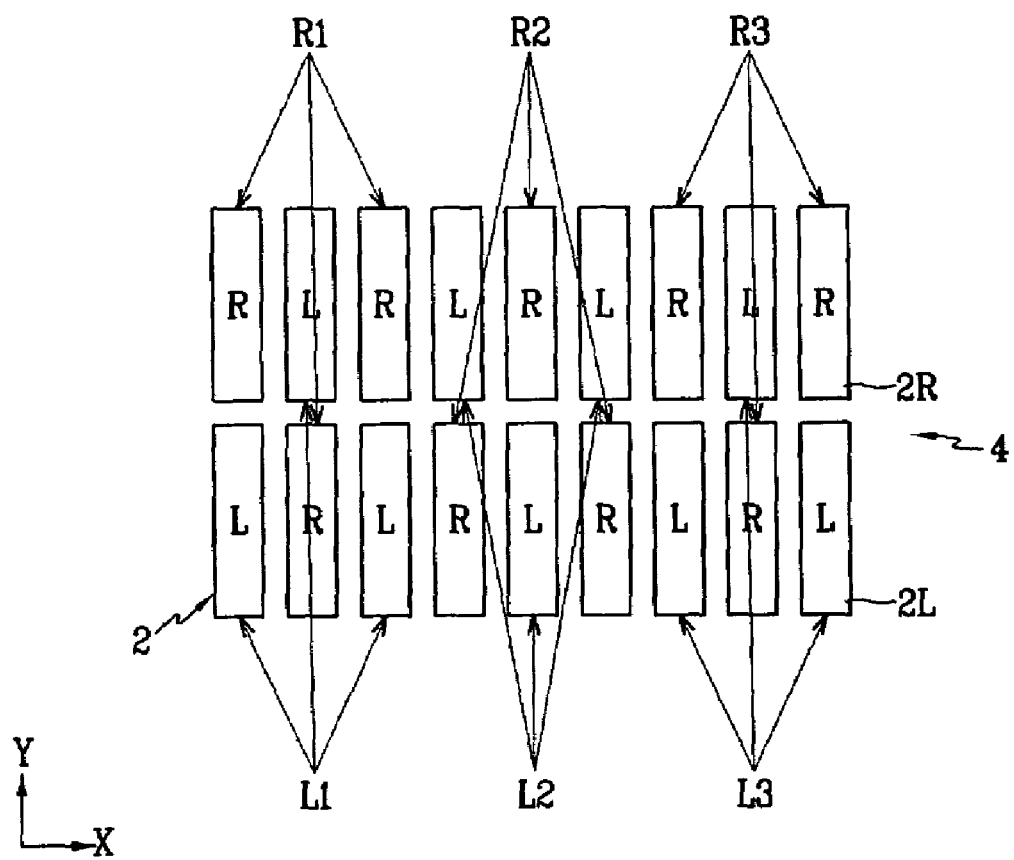
FIG. 3 is a partial front view of an image display unit illustrating the pixel structure of left-eye and right-eye image parts of the 3D display device shown in FIG. 1.

FIG. 3 is a partial front view of the image display unit 4, illustrating the pixel structure of the 3D display device for displaying the left-eye and right-eye image parts.

As shown in FIG. 3, with the arrangement of sub-pixels 2 of the image display unit 4 and the parallax barrier 10, among the six sub-pixels with the three sub-pixels continuously arranged at the odd-numbered row and the three sub-pixels continuously arranged at the even-numbered row, the two right-eye sub-pixels 2R placed at the odd-numbered row and the one right-eye sub-pixel 2R placed at the even-numbered row form a triangle while constructing one pixel R1 or R3 for the right-eye image. The one left-eye sub-pixel 2L placed at the odd-numbered row and the two left-eye sub-pixels 2L placed at the even-numbered row form a triangle while constructing one pixel L1 or L3 for the left-eye image. Further, one right-eye sub-pixel 2R placed at the odd-numbered row and two right-eye sub-pixels 2R placed at the even-numbered row form a triangle while constructing one pixel R2 for the right-eye image. In addition, two left-eye sub-pixels 2L placed at the odd-numbered row and one left-eye sub-pixel 2L placed at the even-numbered row form a triangle while constructing one pixel L2 for the left-eye image.

Figure 14:
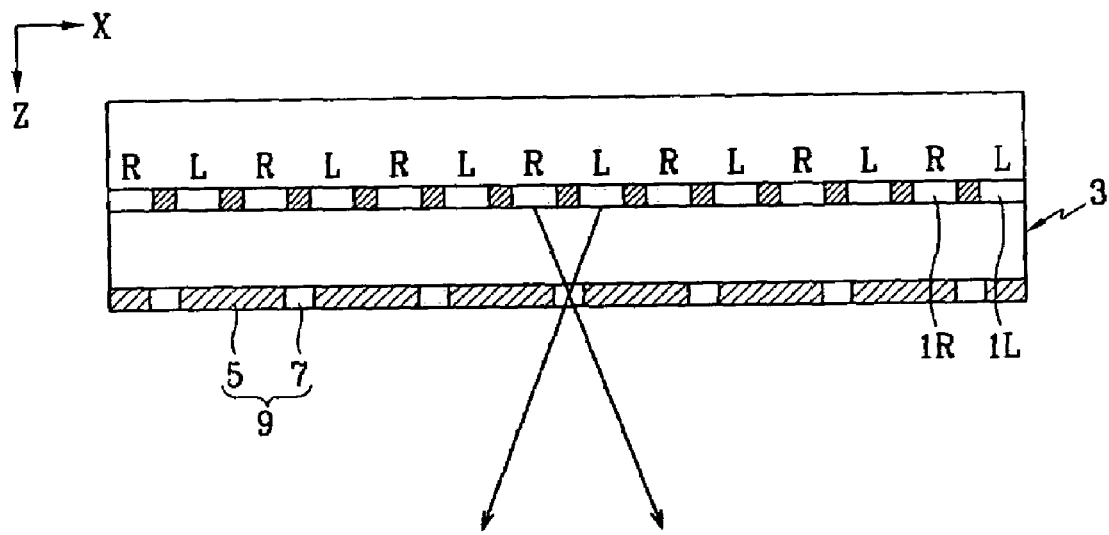
FIG. 14 is a partial sectional view of the 3D display device shown in FIG. 13.
Figure 15:
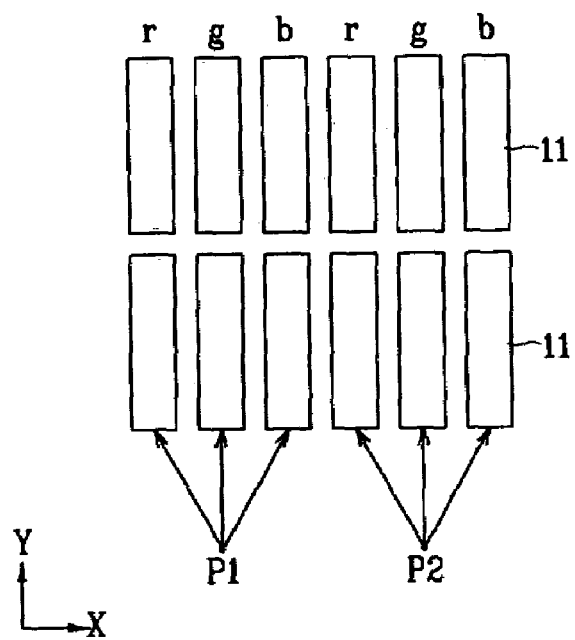
FIG. 15 schematically illustrates the pixel arrangement structure of a 2D image with a common 2D image display device.
Figure 16:
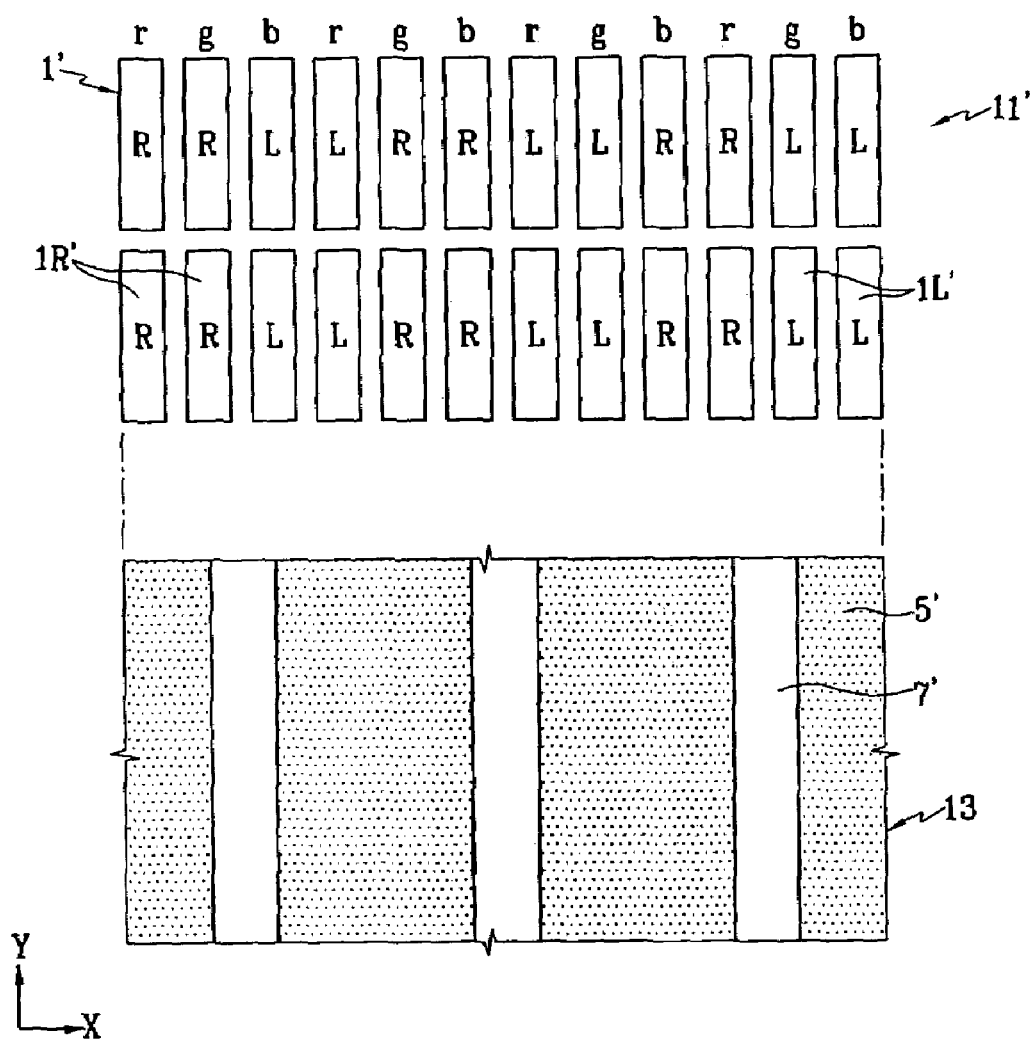
FIGS. 16 and 17 are schematic views of an image display unit and a parallax barrier of 3D display devices according to other prior art, respectively.
Figure 17:
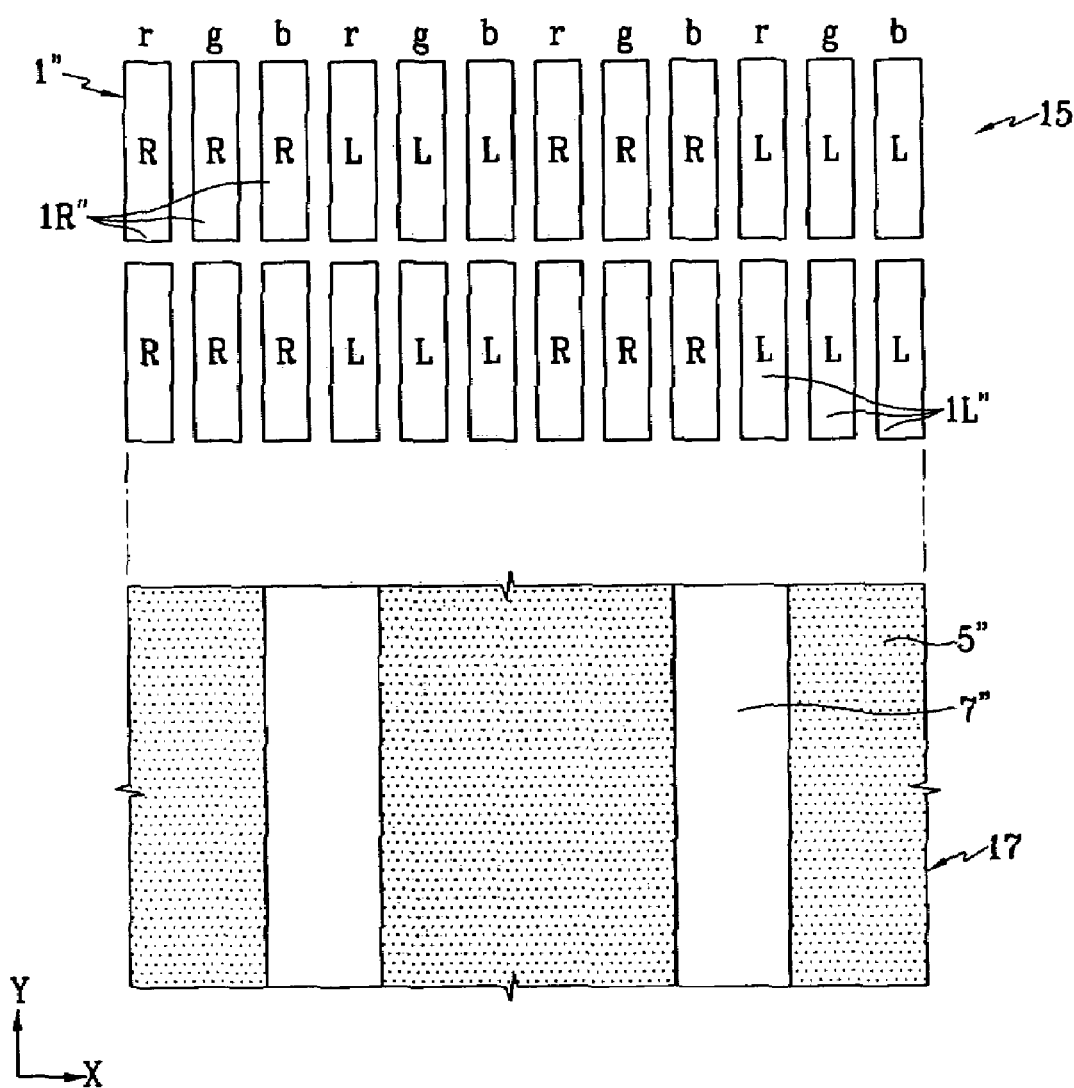

When the pixel arrangement R1, R2 and R3 for the right-eye image part and the pixel arrangement L1, L2 and L3 for the left-eye image part are compared with the pixel arrangement for the 2D image shown in FIG. 14, it turns out that the horizontal resolution of the left-eye image and the right-eye image is substantially the same as that of the 2D image.

Although the vertical resolution of the left-eye image and the right-eye image (i.e., measured in the direction of the column of the sub-pixel array) is half the vertical resolution of the 2D image, most of the resolution factors of the screen identified by the viewer depend upon the horizontal resolution, and hence, the possible bad effect induced by the deterioration in the vertical resolution is not influential.

Meanwhile, with the parallax barrier 10, the inter-center distance between the light transmission portions 8 in the direction of the row of the sub-pixel array, that is, the pitch $p_1$ thereof is expressed by the following Equation 1:

$$p_1 = \frac{2nR'W_1}{R' + r'} \quad \text{Equation 1)}$$

where R' is the visual range of viewing the 3D image by the viewer, r' is the distance between the pixel interface of the image display unit and the image separation interface of the parallax barrier, n is the number of the left-eye sub-pixels or the right-eye sub-pixels continuously arranged in the direction of the row of the sub-pixel array, which in this case is equal to 1, and $W_1$ is the inter-center distance between the sub-pixels measured in the direction of the row of the array.

For convenience, it is illustrated in FIG. 1 that the pitch p1 between the light transmission portions 8 is twice the inter-center distance $W_1$ of the sub-pixels 2 in the direction of the row. However, in practice, in consideration of the screen convergence in the direction of the row (i.e., the degree of entrance of the left-eye image and the right-eye image displayed at the image display unit to the left eye and the right eye of the viewer), the pitch $p_1$ between the light transmission portions 8 should be slightly less than double the inter-center distance $W_1$ of the sub-pixels 2 measured in the direction of the row.

In consideration of the screen convergence in the direction of the column of the sub-pixel array 2, the inter-center distance between the light transmission portions in the direction of the column, that is, the pitch p2 thereof should be established in accordance with the following Equation 2:

$$p_2 = \frac{2R'W_2}{R' + r'} \quad \text{Equation 2)}$$

where R' and r' are the same as those of the Equation 1, and $W_2$ indicates the inter-center distance between the sub-pixels measured in the direction of the column of the array.

Figure 4:
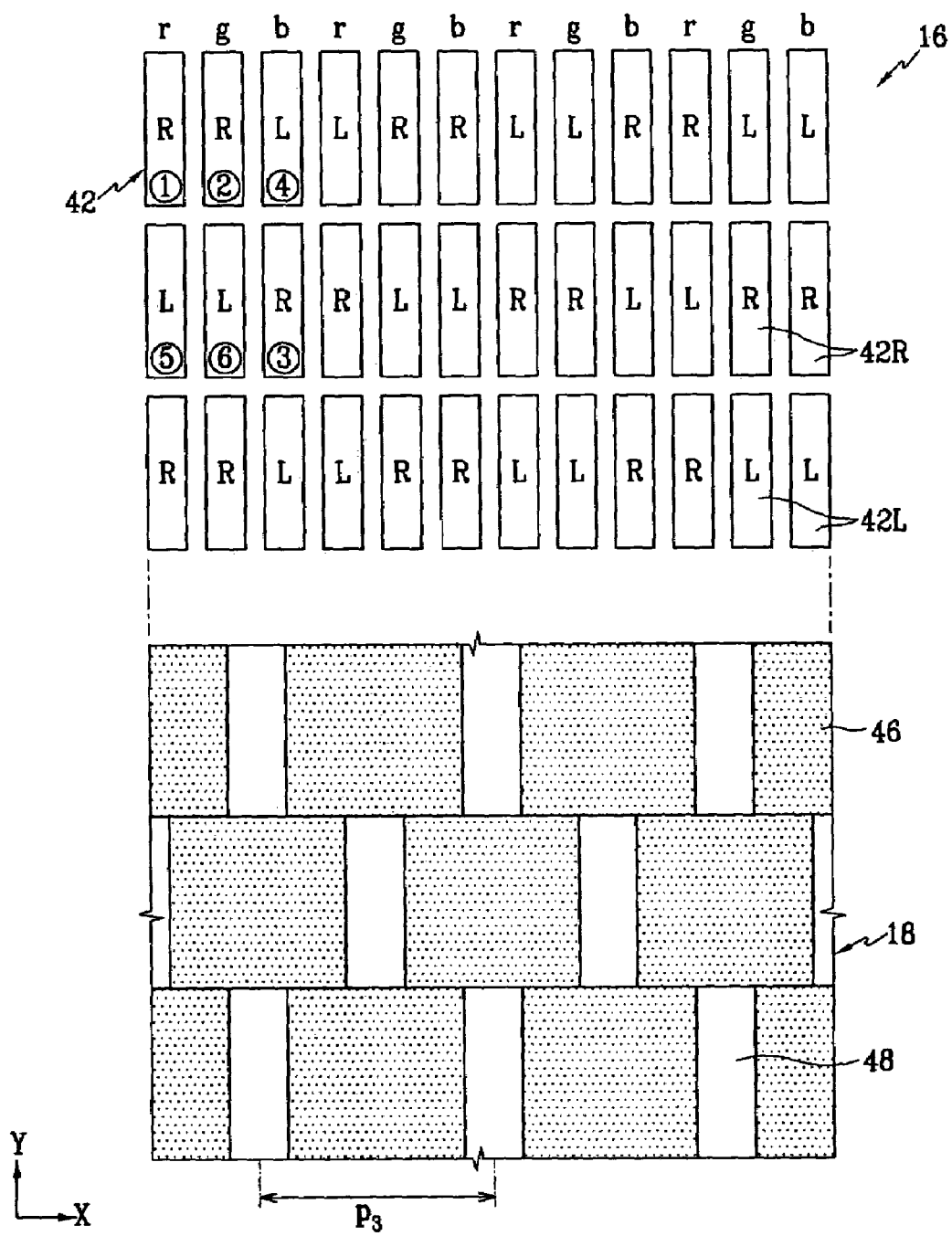
FIGS. 4 to 8 are schematic views of an image display unit and a parallax barrier of 3D display devices according to second to sixth exemplary embodiments of the present invention, respectively.

FIG. 4 schematically illustrates an image display unit 16 and a parallax barrier 18 of a 3D display device according to a second exemplary embodiment of the present invention.

As shown in FIG. 4, the image display unit 16 groups together two sub-pixels in the direction of the row of the sub-pixel array 42 (i.e., in the direction of the X axis of FIG. 4), and alternately and repeatedly inputs the right-eye and left-eye signals R and L thereto. With the second row located in the direction of the column of the array (i.e., in the direction of the Y axis of FIG. 4) from the first row, the sub-pixels 42 are displaced or offset by two sub-pixels in the direction of the row with respect to the sub-pixels 42 placed at the first row.

For example, two right-eye sub-pixels ① and ② placed at the first row and a right-eye sub-pixel ③ placed at the second row collectively form one pixel for the right-eye image, and a left-eye sub-pixel ④ placed at the first row and two left-eye sub-pixels ⑤ and ⑥ placed at the second row collectively form one pixel for the left-eye image.

In this case, light transmission portions 48 of the parallax barrier 18 may be disposed between the two right-eye sub-pixels 42R and the two left-eye sub-pixels 42L arranged in the direction of the row of the array to separate the right-eye image and the left-eye image displayed at the right-eye sub-pixels 42R and the left-eye sub-pixels 42L to the right eye and the left eye of the viewer, respectively.

The parallax barrier 18 has a plurality of rows having light interception portions 46 and the light transmission portions 48 that correspond to the respective rows of the sub-pixel array 42 with a cyclic repetition pattern which repeats every two rows.

Figure 5:
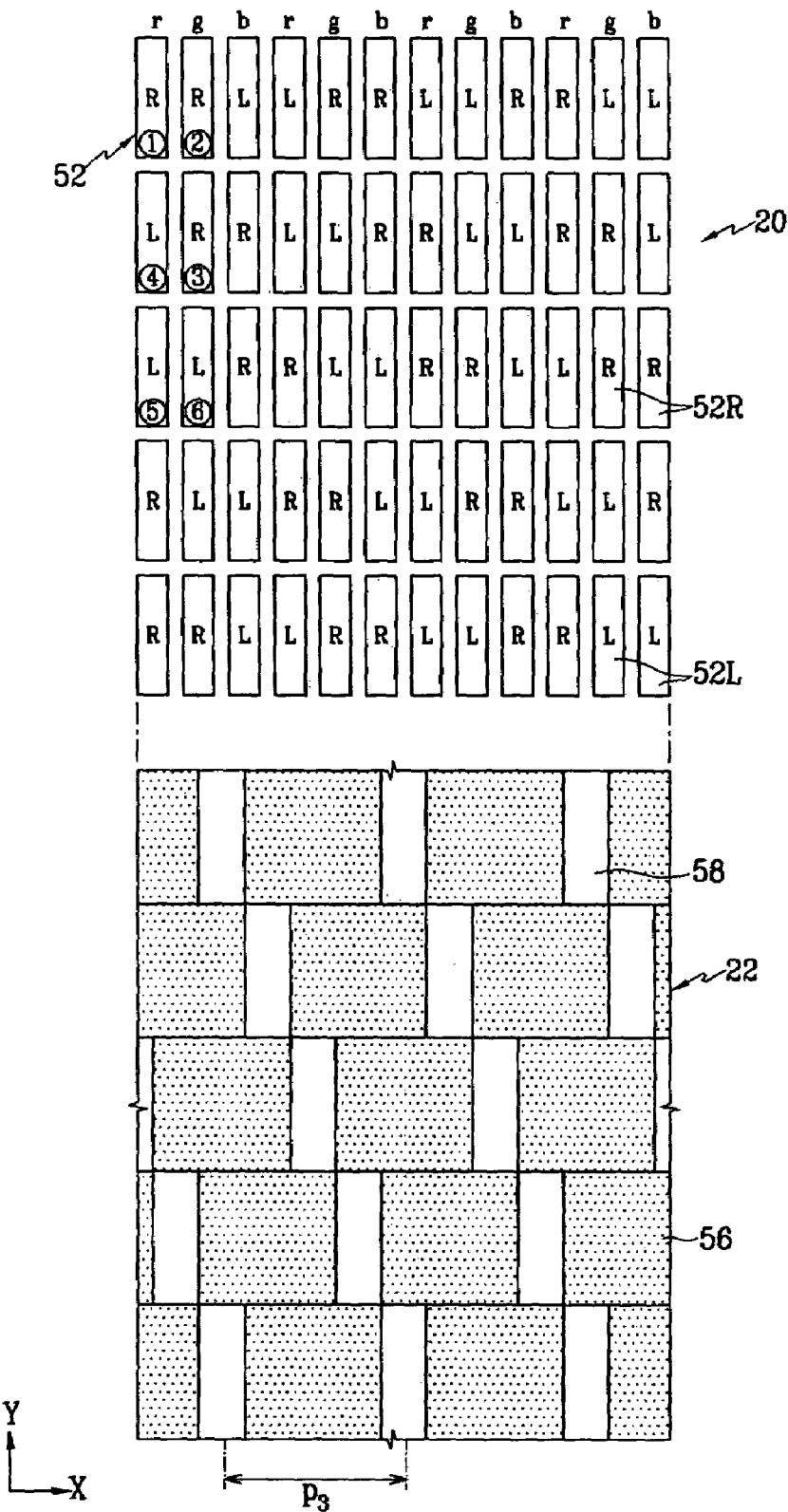

FIG. 5 is a schematic view of an image display unit 20 and a parallax barrier 22 of a 3D display device according to a third exemplary embodiment of the present invention.

As shown in FIG. 5, the image display unit 20 groups together the two sub-pixels 52 in the direction of the row of the sub-pixel array 52 (i.e., in the direction of the X axis of FIG. 5), and alternately and repeatedly inputs left-eye and right-eye image signals L and R thereto. With the second row located in the direction of the column of the array (in the direction of the Y axis of FIG. 5) from the first row, the sub-pixels 52 are displaced or offset by one sub-pixel in the direction of the row with respect to the sub-pixels placed at the first row.

For example, two right-eye sub-pixels ① and ② placed at the first row and a right-eye sub-pixel ③ placed at the second row collectively form one pixel for the right-eye image, and a left-eye sub-pixel ④ placed at the second row and two left-eye sub-pixels ⑤ and ⑥ placed at the third row collectively form one pixel for the left-eye image.

In this case, light transmission portions 58 of the parallax barrier 22 may be disposed between the two right-eye sub-pixels 52R and the two left-eye sub-pixels 52L arranged in the direction of the row of the sub-pixel array 52. The parallax barrier 22 has a plurality of rows having light interception portions 56 and the light transmission portions 58 that correspond to the respective rows of the sub-pixel array 52 with a cyclic repetition pattern which repeats every four rows.

The pitch $p_3$ between the light transmission portions 58 in the direction of the row of the array should be twice the pitch p1 between the light transmission portions expressed in the Equation 1.

Figure 6:
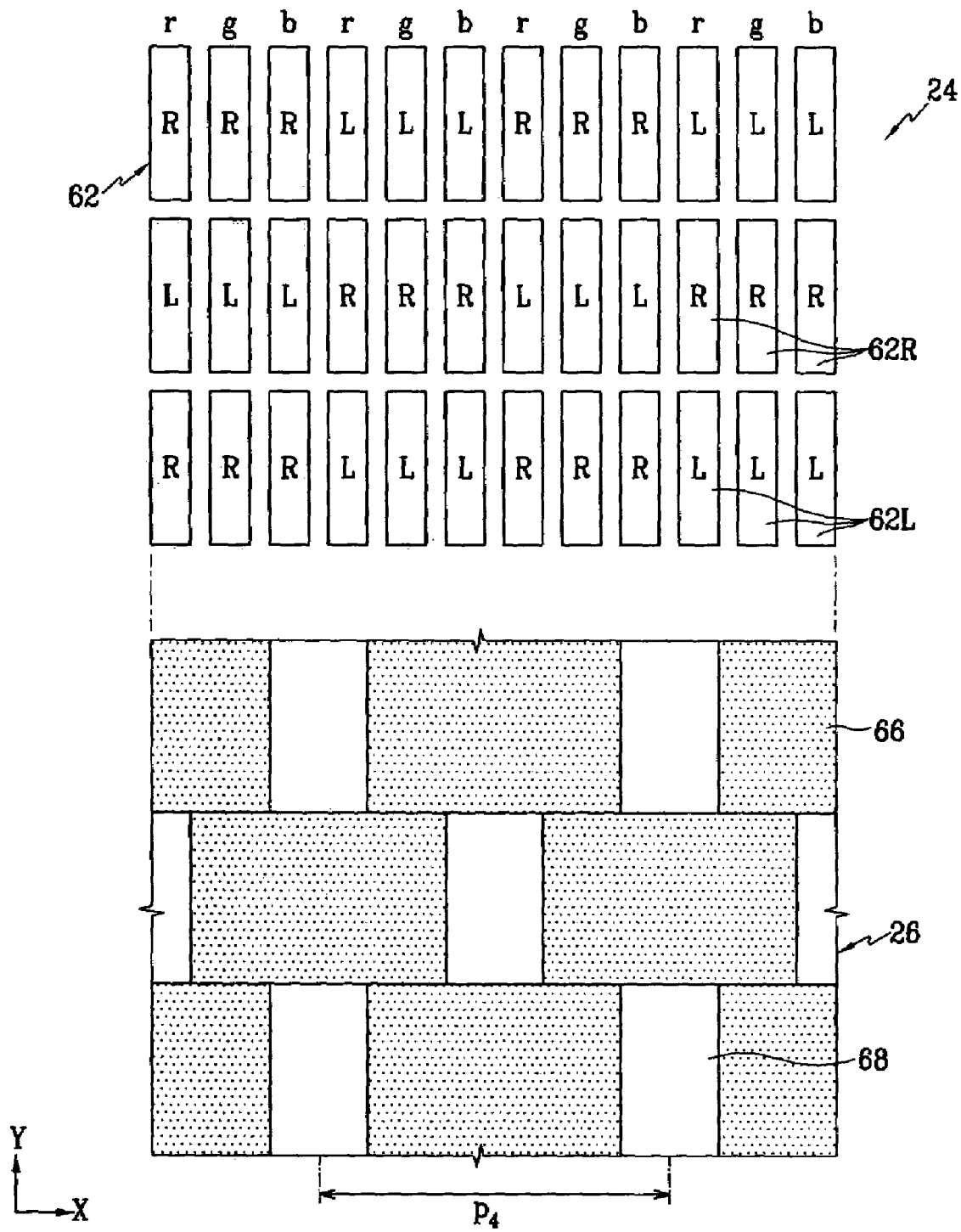

FIG. 6 is a schematic view of an image display unit 24 and a parallax barrier 26 of a 3D display device according to a fourth exemplary embodiment of the present invention.

As shown in FIG. 6, the image display unit 24 groups together three sub-pixels 62 in the direction of the row of the sub-pixel array 62 (i.e., in the direction of the X axis of FIG. 6), and alternately and repeatedly inputs the right-eye image signals R and the left-eye image signals L thereto. With the second row placed in the direction of the column of the array (i.e., in the direction of the Y axis of FIG. 6) from the first row, the sub-pixels 62 are displaced or offset by three sub-pixels in the direction of the row with respect to the sub-pixels 62 placed at the first row.

In this case, the light transmission portions 68 of the parallax barrier 26 may be disposed between the three right-eye sub-pixels 62R and the three left-eye sub-pixels 62L arranged in the direction of the row of the sub-pixel array 62 to separate the right-eye image and the left-eye image displayed at the right-eye sub-pixels 62R and the left-eye sub-pixels 62L in the directions of the right eye and the left eye of the viewer.

The parallax barrier 22 has a plurality of rows having light interception portions 56 and the light transmission portions 68 that correspond to the respective rows of the sub-pixel array 62 with a cyclic repetition pattern which repeats every two rows.

Figure 7:
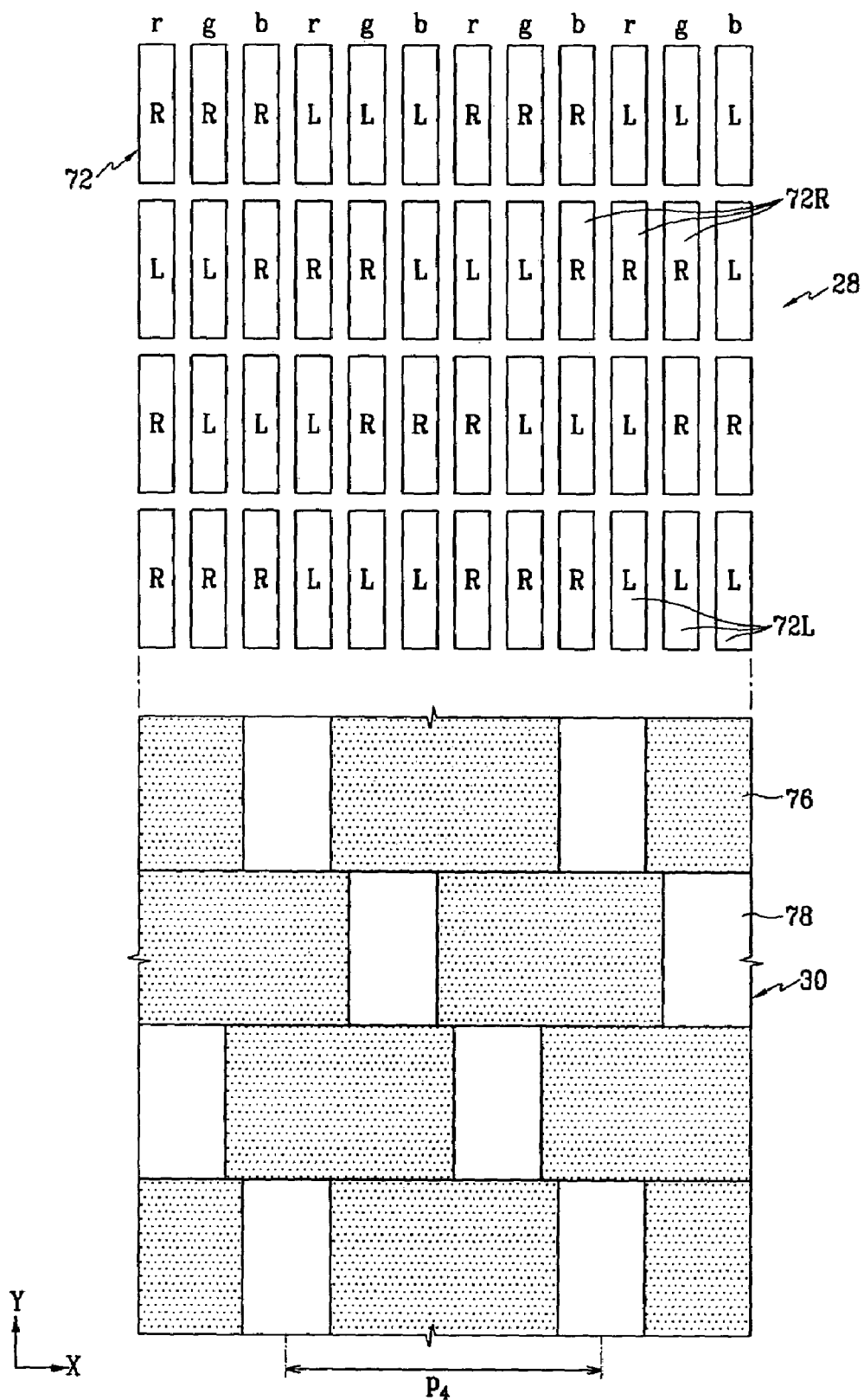

FIG. 7 is a schematic view of an image display unit 28 and a parallax barrier 30 of a 3D display device according to a fifth exemplary embodiment of the present invention.

As shown in FIG. 7, the image display unit 28 groups together three sub-pixels 72 in the direction of the row of the sub-pixel array 72 (i.e., in the direction of the X axis of FIG. 7), and alternately and repeatedly inputs the right-eye image signals R and the left-eye image signals L thereto. With the second row placed in the direction of the column of the array (in the direction of the Y axis of FIG. 7) from the first row, the sub-pixels 72 are displaced or offset by two sub-pixels 72 in the direction of the row with respect to the sub-pixels 72 placed at the first row.

In this case, the light transmission portions 78 of the parallax barrier 30 may be disposed between the three right-eye sub-pixels 72R and the three left-eye sub-pixels 72L arranged in the direction of the row of the sub-pixel array 72. The parallax barrier 30 has a plurality of rows having light interception portions 76 and the light transmission portions 78 that correspond to the respective rows of the sub-pixel array 72 with a cyclic repetition pattern which repeats every three rows.

Figure 8:
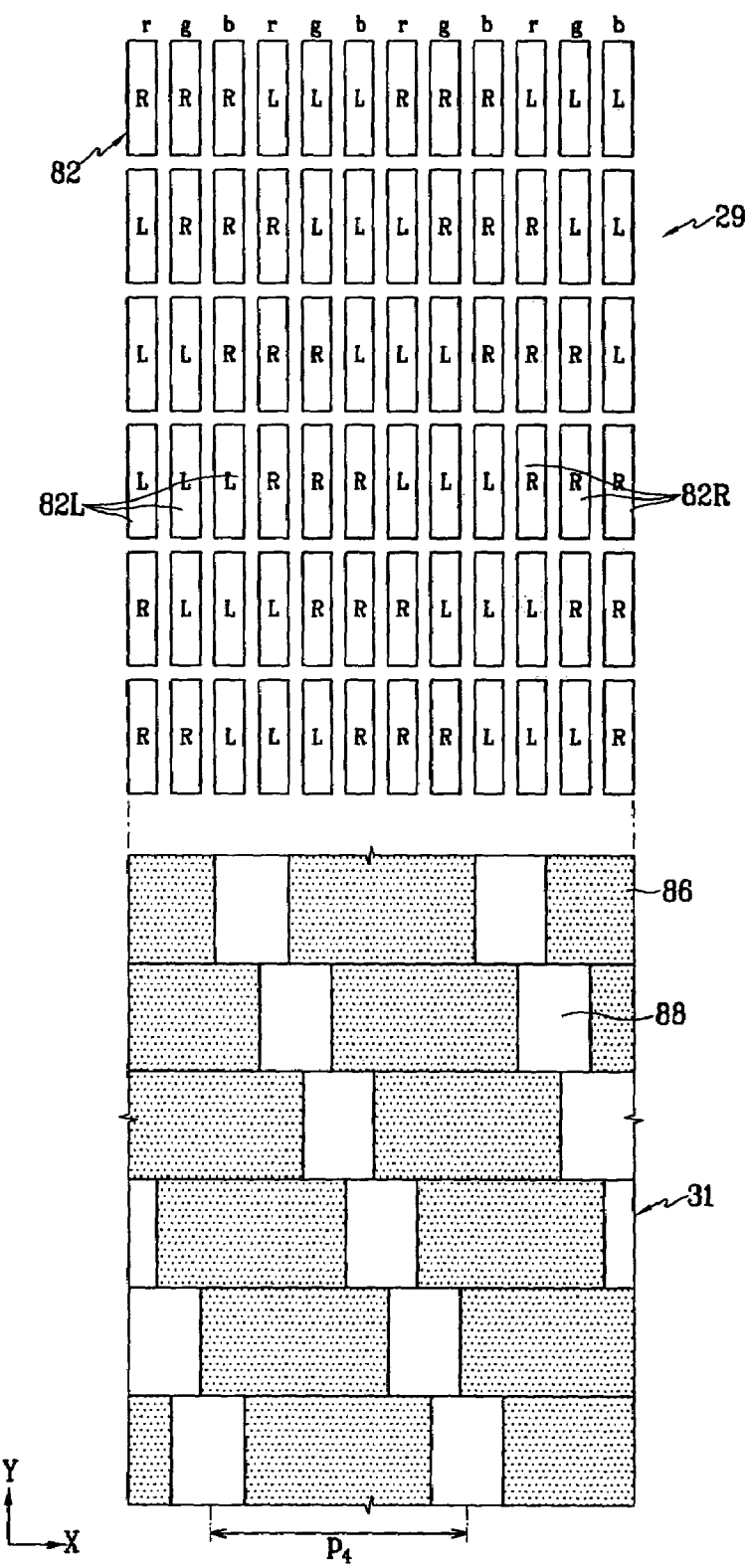

FIG. 8 is a schematic view of an image display unit 29 and a parallax barrier 31 of a 3D display device according to a sixth exemplary embodiment of the present invention.

As shown in FIG. 8, the image display unit 29 groups together three sub-pixels 82 in the direction of the row of the sub-pixel array 82 (i.e., in the direction of the X axis of FIG. 8), and alternately and repeatedly inputs the right-eye image signals R and the left-eye image signals L thereto. With the second row placed in the direction of the column of the array (i.e., in the direction of the Y axis of FIG. 8) from the first row, the sub-pixels 82 are displaced or offset by one sub-pixel in the direction of the row with respect to the sub-pixels 82 placed at the first row.

In this case, light transmission portions 88 of the parallax barrier 31 may be disposed between three right-eye sub-pixels 82R and three left-eye sub-pixels 82L arranged in the direction of the row of the sub-pixel array 82. The parallax barrier 31 has a plurality of rows having light interception portions 86 and the light transmission portions 88 that correspond to the respective rows of the sub-pixel array 82 with a cyclic repetition pattern which repeats every six rows.

With the structures according to the fourth to sixth exemplary embodiments of the present invention, three right-eye subs-pixels 62R, 72R or 82R of the six sub-pixels 62, 72 or 82 form one pixel for the right-eye image, and the remaining three left-eye sub-pixels 62L, 72L or 82L form one pixel for the left-eye image.

Further, with the structures according to the fourth to sixth exemplary embodiments of the present invention, the pitch $p_4$ of the light transmission portions 68, 78 or 88 in the direction of the row of the array should be three times larger than the pitch $p_1$ of the light transmission portions expressed by the Equation 1 with the first exemplary embodiment of the present invention.

Figure 9A:
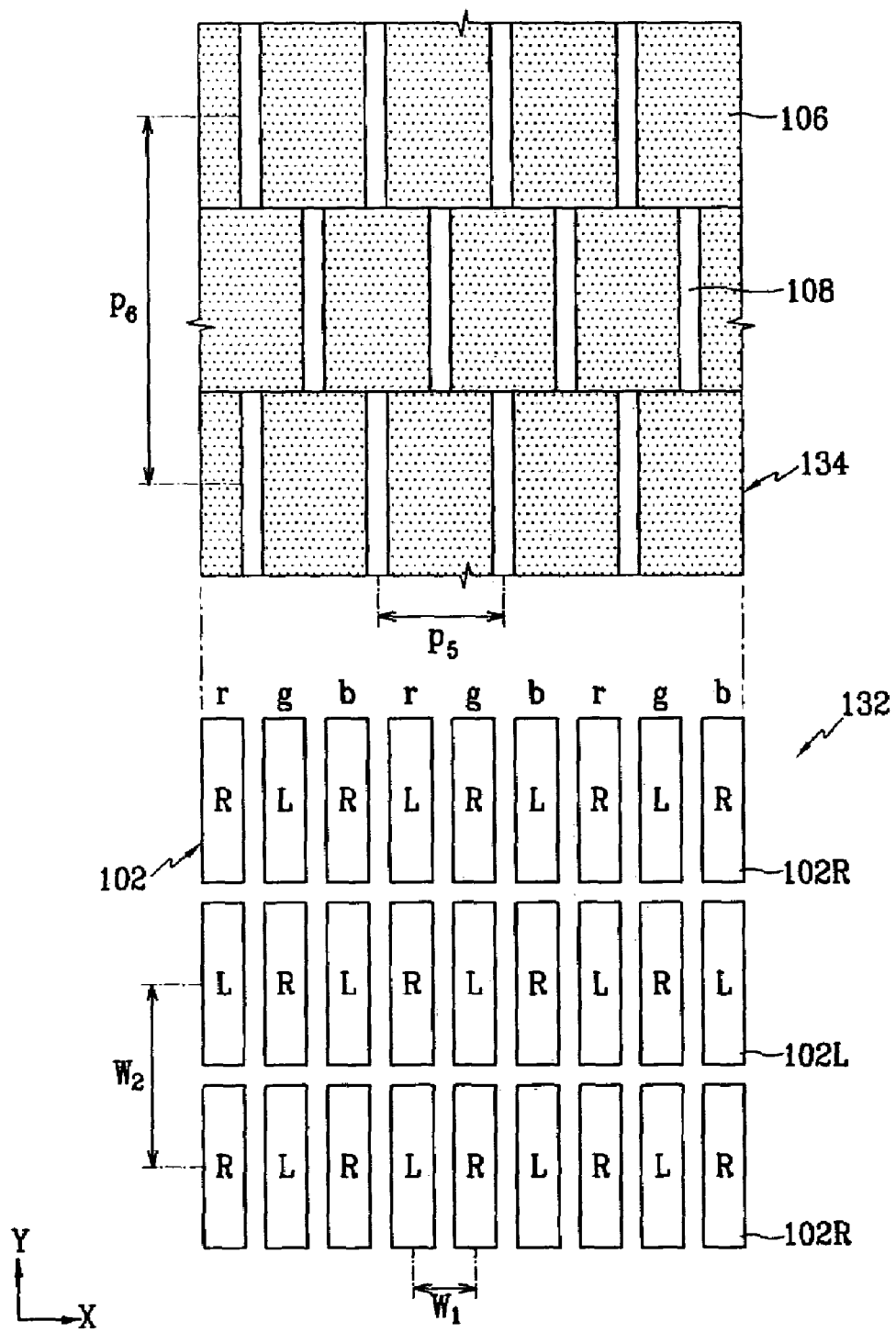
FIGS. 9A, 9B and 9C are a schematic view, and partial sectional views of a 3D display device according to a seventh exemplary embodiment of the present invention, respectively illustrating the cross sections thereof at an odd-numbered row and an even-numbered row thereof.
Figure 9B:
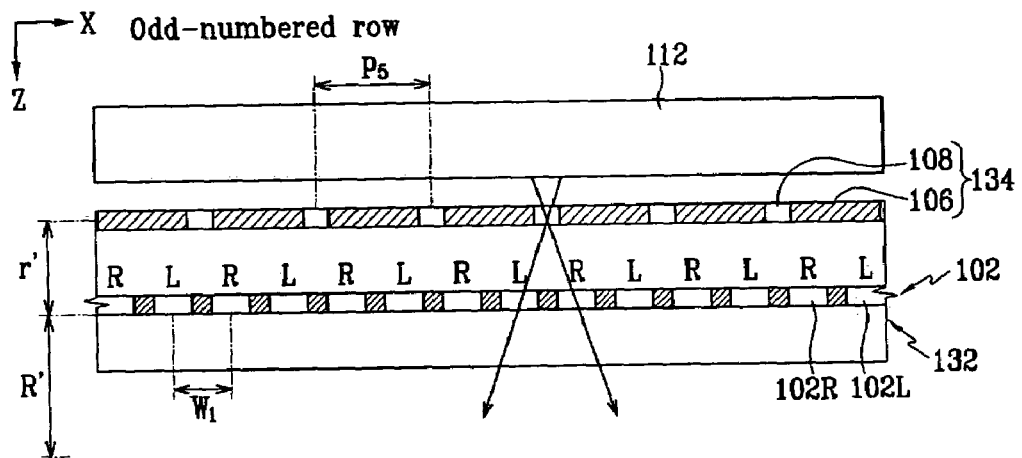
Figure 9C:
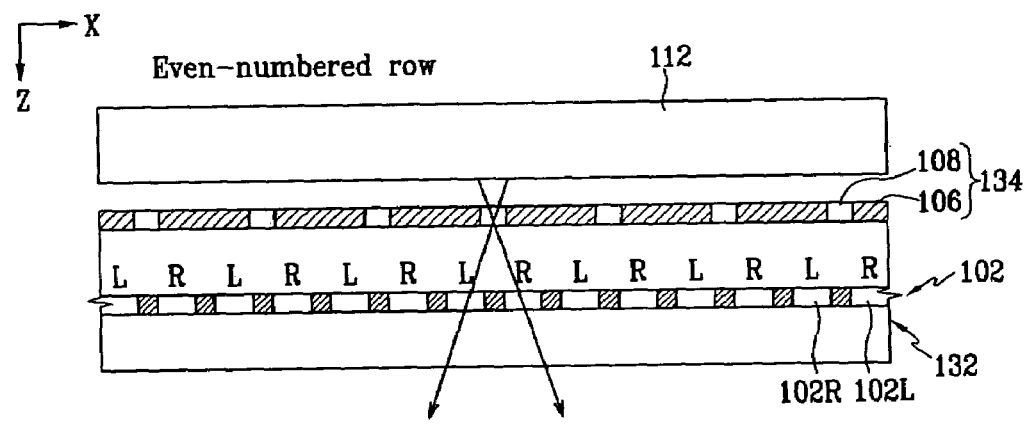

It is explained above that the parallax barrier is placed in front of the image display unit. Alternatively, in the case of a transmission type display device (for instance, a transmission type liquid crystal display) shown in FIGS. 9A-C according to a seventh exemplary embodiment of the present invention, where an image display unit 132 displays an image upon receiving a light from a light source 112, a parallax barrier 134 may be disposed between the light source 112 and the image display unit 132.

In this case, the parallax barrier 134 separates the light provided by the light source 112 into a left-eye part and a right-eye part, and gives the left-eye part to left-eye sub-pixels 102L provided at the image display unit 132 while giving a right-eye part to right-eye sub-pixels 102R provided at the image display unit 132. Accordingly, the left-eye sub-pixels 102L of the image display unit 132 display the left-eye image, and the right-eye sub-pixels 102R display the right-eye image.

With the parallax barrier 134 according to the present embodiment, the inter-center distance between light transmission portions 108 (having light interception portions 106 therebetween) in the direction of the row of the sub-pixel array 102 (i.e., in the direction of the X axis of FIG. 9A), that is, the pitch $p_5$ is expressed by the following Equation 3. In consideration of the screen convergence in the direction of the row, the pitch $p_5$ between the light transmission portions 108 should be established to be slightly less than double the inter-center distance $W_1$ of the sub-pixels 102 measured in the direction of the row.

$$p_5 = \frac{2n(R' + r')W_1}{R'} \qquad \text{Equation 3)}$$

where R' is the visual range of viewing the 3D image by the viewer, r' is the distance between the pixel interface of the image display unit 132 and the image separation interface of the parallax barrier 134, n is the number of the left-eye sub-pixels or the right-eye sub-pixels continuously arranged in the direction of the row of the sub-pixel array which is equal to 1 in this case, and $W_1$ is the inter-center distance between the sub-pixels 102 measured in the direction of the row of the array.

In consideration of the screen convergence in the direction of the column, the inter-center distance between the light transmission portions in the direction of the column of the array, that is, the pitch $p_6$ should be expressed using Equation 4. In this case, as the parallax barrier 134 according to the present embodiment has the same front shape as the parallax barrier 10 shown in FIG. 1, the pitch $p_6$ is identical to the pitch $p_2$ of FIG. 1, and the value $W_2$ of the Equation 4 is identical to the value $W_2$ of FIG. 1.

$$p_6 = \frac{2(R' + r')W_2}{R'} \qquad \text{Equation 4)}$$

where R' and r' are the same as those with the Equation 1, and $W_2$ indicates the inter-center distance between the sub-pixels measured in the direction of the column of the array.

Some exemplary variants of the parallax barrier will now be explained with reference to FIGS. 100A-B, 11 and 12.

Figure 10A:
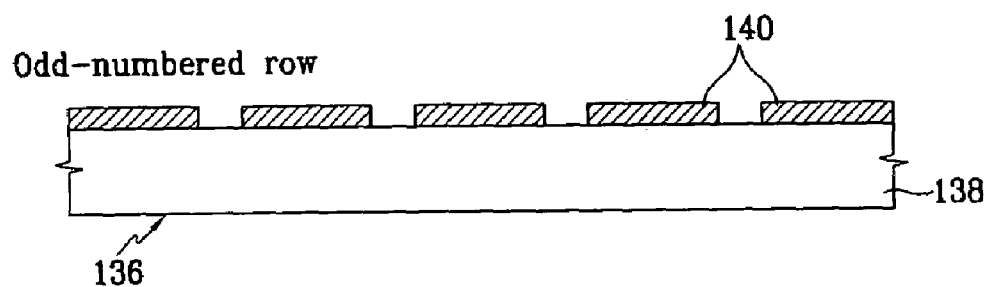
FIGS. 10A, 10B, 11 and 12 schematically illustrate variants of a parallax barrier of a 3D image parallax barrier according to an exemplary embodiment of the present invention.
Figure 10B:
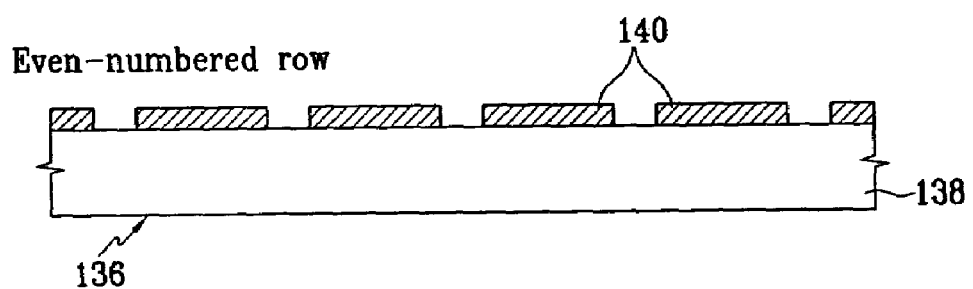

As shown in FIGS. 10A and 10B, for example, a first variant of the parallax barrier 136 includes a transparent film 138, and an opaque layer 140 placed on the transparent film 138 with the same pattern as the light interception portions 6 shown in FIG. 1. The opaque layer 140 corresponds to the light interception portions 6, and the portion of the transparent film 138 with no opaque layer 140 corresponds to the light transmission portions 8.

Figure 11:
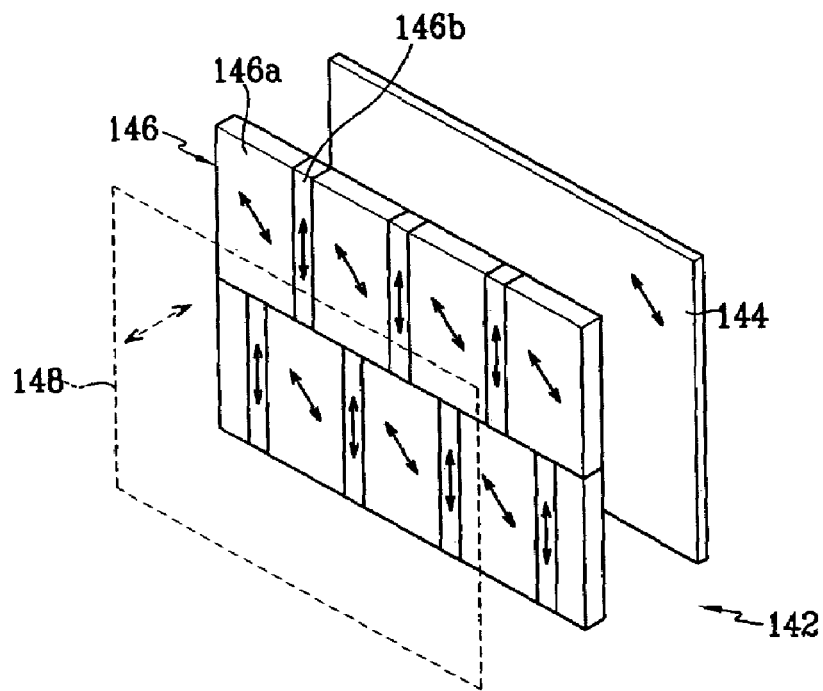

As shown in FIG. 11, a second variant of a parallax barrier 142 includes an input-sided polarizing plate 144, a polarization variation plate 146, and an output-sided polarizing plate 148. By way of example, the polarization variation plate 146 has first retarders 146a corresponding to the arrangement of the light interception portions 6 shown in FIG. 1, and second retarders 146b corresponding to the arrangement of the light transmission portions 8 shown in FIG. 1. The first and the second retarders 146a and 146b are formed with a half-wave plate (i.e., a λ/2 plate), for example.

The optical axis of the first retarder 146a is parallel to the optical axis of the input-sided polarizing plate 144, and the optical axis of the second retarder 146b is angled at 45° to the optical axis of the input-sided polarizing plate 144. The optical axis of the output-sided polarizing plate 148 is perpendicular to the optical axis of the input-sided polarizing plate 144.

When the light polarized along the optical axis of the input-sided polarizing plate 144 is provided to the polarization variation plate 146, the light incident upon the first retarder 146a directly passes through the first retarder 146a, and is intercepted by the output-sided polarizing plate 148. By contrast, the light incident upon the second retarder 146b passes through the second retarder 146b while rotated by 90° in the polarizing axis thereof. As the rotated polarizing axis of the light corresponds to the optical axis of the output-sided polarizing plate 148, it passes through the output-sided polarizing plate 148.

Accordingly, with the parallax barrier 142, the portion thereof corresponding to the first retarder 146a intercepts light, and the portion thereof corresponding to the second retarder 146b transmits light.

Figure 12:
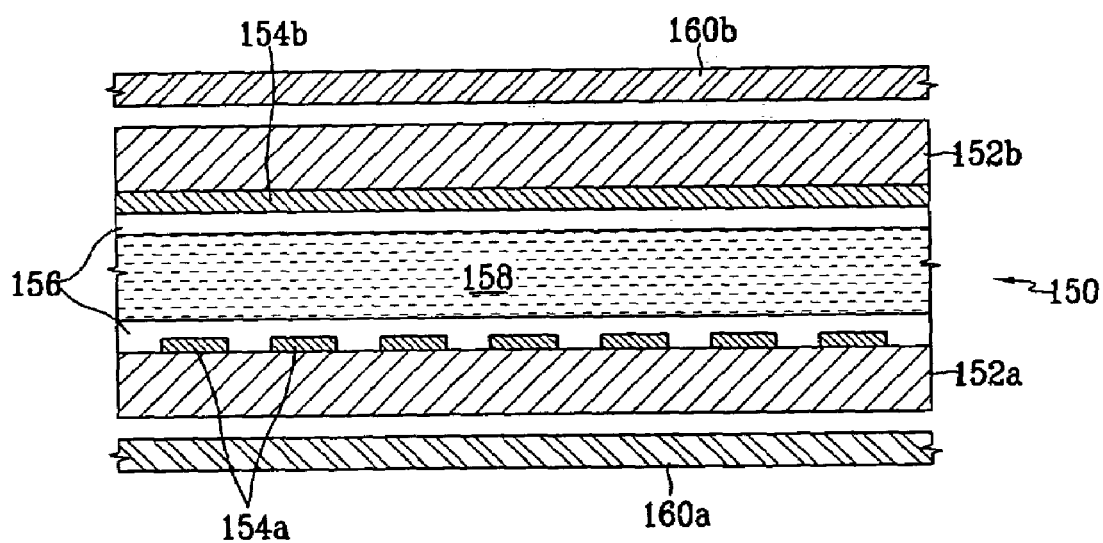
Figure 13:
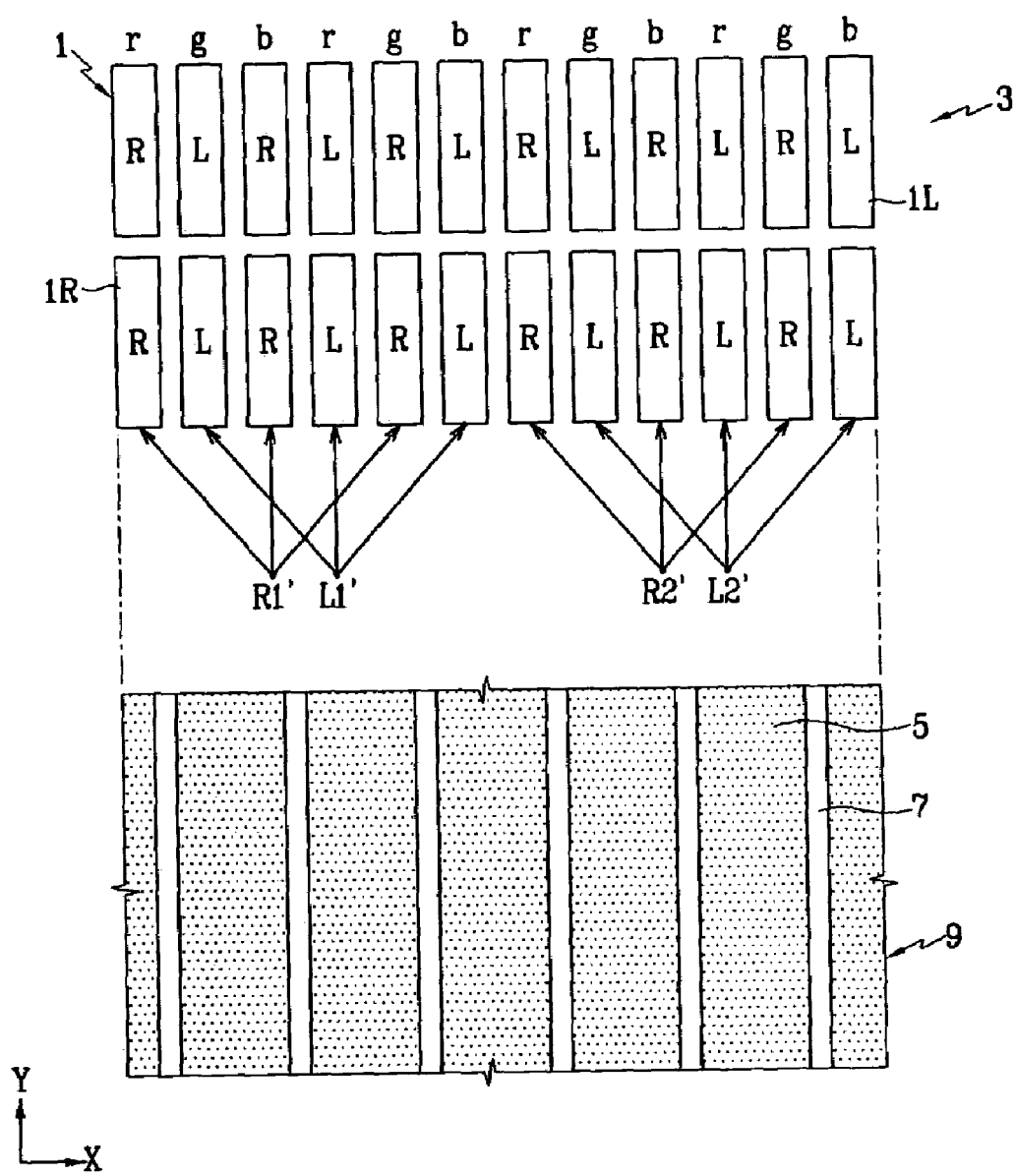
FIG. 13 is a schematic view of a 3D display device with a parallax barrier according to prior art.

A third variant of a parallax barrier shown in FIG. 12 includes a liquid crystal shutter 150 utilizing a normally white mode transmission type liquid crystal display.

The liquid crystal shutter 150 includes first and second substrates 152a and 152b, first and second electrodes 154a and 154b formed on the inner surfaces of the first and second substrates 152a and 152b, a pair of alignment layers 156 covering the first and second electrodes 154a and 154b, a liquid crystal layer 158 disposed between the pair of alignment layers 156, and first and second polarizing plates 160a and 160b attached to the outer surfaces of the first and the second substrates 152a and 152b. Among the first and the second electrodes 154a and 154b, for example, the first electrodes 154a are formed with the same pattern as the light interception portions 6 shown in FIG. 1.

In this case, the first electrodes 154a are structured to concurrently receive the driving voltages when the liquid crystal shutter 150 is driven. Accordingly, when a predetermined driving voltage is applied to the first and the second electrodes 154a and 154b, the arrangement of the liquid crystal molecules contained in the liquid crystal layer 158 is varied at the locations of the first electrodes 154a to thereby intercept the light, and transmit the light at the locations with no electrode.

With the above-structured parallax barrier and a 3D display device using the same, the resolution of the 3D image is increased to the resolution level of the 2D image, thereby realizing a high quality 3D image.

As described above, the horizontal resolution level of the existing 2D image can be realized by the arrangement of the light transmission portions and the light interception portions of the parallax barrier and the arrangement of sub-pixels of the image display unit. Accordingly, the 3D display device of the present invention can display high quality 3D images with a resolution level of the 2D image.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A parallax barrier for a three-dimensional display device, the three-dimensional display device including an image display unit having sub-pixels for displaying a display image having a left-eye image part and a right-eye image part, the sub-pixels including a plurality of left-eye sub-pixels for displaying the left-eye image part and a plurality of right-eye sub-pixels for displaying the right-eye image part, the sub-pixels being organized into a sub-pixel array of rows and columns, each of the rows extending in a row direction and each of the columns extending in a column direction, wherein the parallax barrier is configured to provide the display image to a viewer as a three-dimensional image at a visual range by separating the display image to the left-eye image part and the right-eye image part, the parallax barrier comprising:

a plurality of light interception portions and a plurality of light transmission portions arranged in a plurality of parallax barrier rows corresponding to the rows of the sub-pixel array, the light transmission portions having respective centers in the row direction, such that the centers of the light transmission portions in each of the parallax barrier rows are fixedly offset from the centers of the light transmission portions in at least one other row of the parallax barrier rows during at least one frame of the display image, and each of the light transmission portions corresponds to a region between at least one of the left-eye sub-pixels and at least one of the right-eye sub-pixels that are adjacent each other, so as to transmit the left-eye image part toward a left eye of the viewer and to transmit the right-eye image part toward a right eye of the viewer.

2. The parallax barrier of claim 1, wherein the centers of the light transmission portions in the row direction of different ones of the parallax barrier rows are offset from each other in a periodically repeating pattern.

3. The parallax barrier of claim 1, wherein the centers of the light transmission portions in two adjacent ones of the parallax barrier rows are offset from each other.

4. The parallax barrier of claim 1, wherein the light interception portions and the light transmission portions are arranged, such that each of the centers of the light transmission portions in the row direction is located between respective said centers in the row direction of two of the light transmission portions in an adjacent one of the parallax barrier rows.

5. The parallax barrier of claim 1, wherein the light transmission portions comprise a transparent film, and the light interception portions comprise an opaque layer on a surface of the transparent film.

6. The parallax barrier of claim 1, wherein the light interception portions and the light transmission portions comprise an input-sided polarizing plate, a polarization variation plate, and an output-sided polarizing plate, the polarization variation plate having first retarders having an arrangement corresponding to that of the light interception portions and second retarders having an arrangement corresponding to that of the light transmission portions.

7. The parallax barrier of claim 6, wherein the first retarders comprise a half-wave plate having an optical axis corresponding to an optical axis of the input-sided polarizing plate, the second retarders comprise a half-wave plate having an optical axis angled at 45° to the optical axis of the input-sided polarizing plate, and an optical axis of the output-sided polarizing plate is perpendicular to the optical axis of the input-sided polarizing plate.

8. The parallax barrier of claim 1, wherein the light transmission portions and the light interception portions comprise first and second substrates, first and second electrodes formed on respective inner surfaces of the first and second substrates, a pair of alignment layers respectively covering the first and second substrates, and a liquid crystal layer disposed between the pair of alignment layers, the first electrode or the second electrode having a same pattern as the light interception portions.

9. A three-dimensional display device comprising:
an image display unit having left sub-pixels for displaying a left-eye image part of an image and right sub-pixels for displaying a right-eye image part of the image, the left sub-pixels including a plurality of red, green and blue left-eye sub-pixels and the right sub-pixels including a plurality of red, green and blue right-eye sub-pixels, the left and right sub-pixels being arranged in a sub-pixel array having rows and columns, each row extending in a row direction and each column extending in a column direction; and
a parallax barrier having a plurality of light interception portions and a plurality of light transmission portions arranged in a plurality of parallax barrier rows corresponding to the rows of the sub-pixels, the light transmission portions having respective centers in the row direction, the parallax barrier being adjacent to the image display unit such that each of the light transmission portions corresponds to a region between at least one of the left-eye sub-pixels and at least one of the right-eye sub-pixels that are adjacent each other, so as to transmit the left-eye image part toward a left eye of a viewer and to transmit the right-eye image part toward a right eye of the viewer to form a three-dimensional image at a visual range,
wherein the centers of the light transmission portions in each of the parallax barrier rows are fixedly offset from the centers of the light transmission portions in at least one other row of the parallax barrier rows during at least one frame of the display image.

10. The three-dimensional display device of claim 9, wherein one of the left-eye sub-pixels and one of the right-eye sub-pixels are alternately and repeatedly arranged in the row and column directions of the sub-pixel array.

11. The three dimensional image display device of claim 10, wherein an inter-center distance $p_2$ between the light transmission portions of the parallax barrier in the column direction of the sub-pixel array satisfies one of the following equations:

$$p_2 = \frac{2R'W_2}{R'+r'}, \text{ and } p_2 = \frac{2(R'+r')W_2}{R'}$$

where R' is a visual range of viewing a three-dimensional image by a viewer, r' is a distance between a pixel interface of the image display unit and an image separation interface of the parallax barrier, and $W_2$ is an inter-center distance between the sub-pixels measured in the column direction of the sub-pixel array.

12. The three-dimensional display device of claim 9, wherein two of the left-eye sub-pixels and two of the right-eye sub-pixels are alternately and repeatedly arranged in the row direction on a first one of the rows of the sub-pixel array, and the sub-pixels on a second one of the rows of the sub-pixel array are offset by at most two of the sub-pixels in the row direction with respect to the sub-pixels on the first one of the rows of the sub-pixel array.

13. The three-dimensional display device of claim 9, wherein three of the left-eye sub-pixels and three of the right-eye sub-pixels are alternately and repeatedly arranged in the row direction on a first one of the rows of the sub-pixel array, and the sub-pixels on a second one of the rows of the sub-pixel array are offset by at most three of the sub-pixels in the row direction with respect to the sub-pixels on the first one of the rows of the sub-pixel array.

14. The three-dimensional display device of claim 9, wherein an inter-center distance $p_1$ between the light transmission portions of the parallax barrier in the row direction of the sub-pixel array satisfies one of the following equations:

$$p_1 = \frac{2nR'W_1}{R'+r'}, \text{ and } p_1 = \frac{2n(R'+r')W_1}{R'}$$

where R' is a visual range of viewing a three-dimensional image by a viewer, r' is a distance between a pixel interface of the image display unit and an image separation interface of the parallax barrier, $W_1$ is an inter-center distance between the sub-pixels measured in the row direction of the sub-pixel array, and n is a number of the left-eye sub-pixels or the right-eye sub-pixels continuously arranged in the row direction of the sub-pixel array.

15. The three-dimensional display device of claim 9, wherein the centers of the light transmission portions in the row direction of different ones of the parallax barrier rows offset from each other in a periodically repeating pattern.

16. The three-dimensional display device of claim 9, wherein the centers of the light transmission portions in two adjacent ones of the parallax barrier rows are offset from each other.

17. The three-dimensional display device of claim 16, wherein the centers of the light transmission portions in different ones of the parallax barrier rows are arranged to repeat periodically, such that the centers of the light transmission portions in at least two of the parallax barrier rows are aligned with each other.

18. The three-dimensional display device of claim 9, wherein the parallax barrier comprises a transparent film, and the light interception portions comprise an opaque layer on a surface of the transparent film.

19. The three-dimensional display device of claim 9, wherein the light interception portions and the light transmission portions of the parallax barrier comprise an input-sided polarizing plate, a polarization variation plate, and an output-sided polarizing plate, the polarization variation plate having first retarders having an arrangement corresponding to that of the light interception portions and second retarders having an arrangement corresponding to that of the light transmission portions.

20. The three-dimensional display device of claim 19, wherein the first retarders comprise a half-wave plate having an optical axis corresponding to an optical axis of the input-sided polarizing plate, and the second retarders comprise a half-wave plate having an optical axis angled at 45° to the optical axis of the input-sided polarizing plate, and an optical axis of the output-sided polarizing plate is perpendicular to the optical axis of the input-sided polarizing plate.

21. The three-dimensional display device of claim 9, wherein the light transmission portions and the light interception portions of the parallax barrier comprise first and second substrates, first and second electrodes formed on respective inner surfaces of the first and second substrates, a pair of alignment layers respectively covering the first and second substrates, and a liquid crystal layer disposed between the pair of alignment layers, and the first electrode or the second electrode has a same pattern as the light interception portions.

22. A parallax barrier for a three-dimensional display device, the three-dimensional display device including an image display unit having sub-pixels for displaying a display image having a left-eye image part and a right-eye image part, the sub-pixels including a plurality of red, green and blue left-eye sub-pixels that form left-eye pixels for displaying the left-eye image part and a plurality of red, green and blue right-eye sub-pixels that form right-eye pixels for displaying the right-eye image part, the sub-pixels being organized into a sub-pixel array of rows and columns, each row extending in a row direction and each column extending in a column direction, wherein the parallax barrier is configured to provide the display image to a viewer as a three-dimensional image at a visual range by separating the display image to the left-eye image part and the right-eye image part, the parallax barrier comprising:

a plurality of light interception portions and a plurality of light transmission portions arranged in a plurality of parallax barrier rows corresponding to the rows of the sub-pixels, so as to transmit the left-eye image part toward a left eye of the viewer and to transmit the right-eye image part toward a right-eye of the viewer, wherein the light transmission portions in different ones of the parallax barrier rows are fixedly offset from each other in accordance with locations of the red, green and blue left-eye sub-pixels and the red, green and blue right-eye sub-pixels during at least one frame of the display image, wherein each of the left-eye pixels is formed from the red, green and blue left-eye sub-pixels of the left-eye sub-pixels on at least two adjacent rows among the rows of the sub-pixel array and each of the right-eye pixels is formed from the red, green and blue right-eye sub-pixels of the right-eye sub-pixels on at least two adjacent rows among the rows of the sub-pixel array, and each of the light transmission portions corresponds to a region between at least one left-eye sub-pixel and at least one right-eye sub-pixel that are adjacent each other among the sub-pixels of a corresponding one of the rows of the sub-pixel array, so as to separate the display image to the left-eye image part and the right-eye image part.

23. A parallax barrier for a three-dimensional display device, the three-dimensional display device including an image display unit having sub-pixels for displaying a display image having a left-eye image part and a right-eye image part, the sub-pixels including a plurality of red, green and blue left-eye sub-pixels that form left-eye pixels for displaying the left-eye image part and a plurality of red, green and blue right-eye sub-pixels that form right-eye pixels for displaying the right-eye image part, the sub-pixels being organized into a sub-pixel array of rows and columns, each row extending in a row direction and each column extending in a column direction, wherein the parallax barrier is configured to provide the display image to a viewer as a three-dimensional image at a visual range by separating the display image to the left-eye image part and the right-eye image part, the parallax barrier comprising:

a plurality of light interception portions and a plurality of light transmission portions arranged in a plurality of parallax barrier rows corresponding to the rows of the sub-pixels, so as to transmit the left-eye image part toward a left eye of the viewer and to transmit the right-eye image part toward a right eye of the viewer, wherein the light transmission portions in different ones of the parallax barrier rows are fixedly offset from each other in accordance with locations of the red, green and blue left-eye sub-pixels and the red, green and blue right-eye sub-pixels during at least one frame of the display image, and wherein each of the left-eye pixels is formed from the red, green and blue left-eye sub-pixels of the left-eye sub-pixels on at least two adjacent rows among the rows of the sub-pixel array and each of the right-eye pixels is formed from the red, green and blue right-eye sub-pixels of the right-eye sub-pixels on at least two adjacent rows among the rows of the sub-pixel array such that a vertical resolution of the display image is at most one-half a vertical resolution of the image display unit, and each of the light transmission portions corresponds to a region between at least one left-eye sub-pixel and at least one right eye sub-pixel that are adjacent each other among the sub-pixels of a corresponding one of the rows of the sub-pixel array, so as to separate the display image to the left-eye image part and the right-eye image part.

* * * * *